(12) United States Patent
Lee et al.

(10) Patent No.: US 7,178,201 B2
(45) Date of Patent: Feb. 20, 2007

(54) HINGE STRUCTURE FOR FLAT VISUAL DISPLAY DEVICE

(75) Inventors: Gang Hoon Lee, Gumi-si (KR); Hong Ki Kim, Deagu-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/500,126

(22) PCT Filed: Jul. 27, 2002

(86) PCT No.: PCT/KR02/01431

§ 371 (c)(1),
(2), (4) Date: Dec. 1, 2004

(87) PCT Pub. No.: WO03/056411

PCT Pub. Date: Jul. 10, 2003

(65) Prior Publication Data

US 2005/0102797 A1    May 19, 2005

(30) Foreign Application Priority Data

Dec. 27, 2001 (KR) .............................. 2001-85858

(51) Int. Cl.
*E05D 11/08* (2006.01)
(52) U.S. Cl. .......................................... 16/342; 16/340
(58) Field of Classification Search .................. 16/342, 16/276, 337–340, 389, 390, 289–291, 286, 16/273; 361/683, 807; 248/917, 920, 922; 455/575.1, 575.3
See application file for complete search history.

(56) References Cited

U.S. PATENT DOCUMENTS

| 5,008,976 | A | | 4/1991 | Busch ........................ 16/276 |
| 5,109,570 | A | * | 5/1992 | Okada et al. ................. 16/289 |
| 5,195,213 | A | * | 3/1993 | Ohgami et al. ............... 16/342 |
| 5,208,944 | A | * | 5/1993 | Lu .............................. 16/278 |
| 5,239,731 | A | * | 8/1993 | Lu .............................. 16/340 |
| 5,406,678 | A | | 4/1995 | Rude et al. ................... 16/342 |
| 5,467,504 | A | * | 11/1995 | Yang ........................... 16/342 |
| 5,598,607 | A | | 2/1997 | Katagiri ....................... 16/337 |
| 5,682,645 | A | | 11/1997 | Watabe et al. ................ 16/338 |
| 5,812,368 | A | * | 9/1998 | Chen et al. .................. 361/681 |
| 6,634,061 | B1 | * | 10/2003 | Maynard ..................... 16/342 |

FOREIGN PATENT DOCUMENTS

GB    2266920 A    * 11/1993

* cited by examiner

*Primary Examiner*—Chuck Y. Mah
(74) *Attorney, Agent, or Firm*—Fleshner & Kim, LLP (57) ABSTRACT

Disclosed is a hinge structure for a flat visual display device. The hinge structure comprises: a fixed plate and pivotal plates respectively fastened to the flat visual display device and a supporting portion for straightening the flat visual display device; rotation shafts with first ends placed in the side of the fixed plate and second ends placed in the side of the pivotal plates, the first or second ends being fixed to allow relative rotational movement between the fixed and pivotal plates; braking members provided around the rotation shafts for applying braking force; and braking housings provided around the braking members and with first fixed ends opposite to the fixed ends of the rotation shaft for applying braking force to faces contacting with the braking members.

4 Claims, 6 Drawing Sheets

HINGE STRUCTURE FOR FLAT VISUAL DISPLAY DEVICE

TECHNICAL FIELD

The present invention relates to a hinge structure, and more particularly, a hinge structure for a flat visual display device which functions as a structure between the flat visual display device and a supporting portion of the display device so as to allow both of the display device and the supporting portion to smoothly operate as well as readily adjust braking force applied thereto owing to frictional force.

BACKGROUND ART

Common household articles adopt a number of hinge structures, which are applied between fixed members and pivotal members to allow relative pivotal movement between both members.

Describing the operation of articles adopting the above hinge structures more specifically by way of examples, the examples may include certain operations such as opening/closing of a cover in an electronic article and vertical adjustment of a flat visual display device. In particular, the present invention relates to a hinge structure, which call be more suitably applied to a flat visual display device.

Further, since the flat visual display device has a considerable amount of weight, the hinge structure needs a braking member for receiving frictional force so that the weight of the flat visual display device can be supported. Also, the hinge structure is generally provided with an elastic member for supporting the weight of the flat visual display device together with the braking member for receiving the frictional force.

Examples of the conventionally proposed hinge structures include those disclosed in Korean Laid-Open Utility Model Registration Application No. 20200110000941 and 20200110000942. In particular, Korean Laid-Open Patent Application No. 1020000028262 discloses an example of hinge structure proposed for application to a visual display unit of an LCD.

However, in the hinge devices proposed in the related art, a rotation shaft inserted into a central axis of the hinge is inconveniently cut into a certain configuration of flat panel.

Further, the hinge structure is so configured to carry out braking by using frictional force generated at both ends of the rotation shaft. The frictional force applied under this configuration is short for supporting the weight of the flat visual display device.

Also, in order to sufficiently strengthen the insufficient frictional force, it is inconveniently required to tighten fastening members such as bolt at both ends of the rotation shaft. When the bolt is loosened from the strongly tightened position, the frictional force also rapidly drops disadvantageously failing to support the weight of the flat visual display device in a sufficient degree.

The present invention has been made to solve the above problem of the related art and it is therefore an object of the invention to provide a hinge structure for a flat visual display device capable of imparting a suitable area to a braying member to which frictional force can be applied so as to more stably support the weight of the flat visual display device.

It is another object of the invention to provide a hinge structure for a flat visual display device capable of reducing the number of washers placed in a boundary face between fixed and rotating members so as to overcome die difficulty in a manufacturing process.

It is further another object of the invention to provide a hinge structure for a flat visual display device which defines a point of generating frictional force, i.e. braking force, into a face contacting with a braking member which is predetermined in the outer circumference of a braking member so as to prevent weakening of the braking force set according to the weight of the flat visual display device thereby prolonging the life time.

DISCLOSURE OF THE INVENTION

According to an aspect of the invention to obtain the above objects of the invention, it is provided a hinge structure for a flat visual display device comprising: a fixed plate and pivotal plates respectively fastened to the flat visual display device and a supporting portion for straightening the flat visual display device; rotation shafts with first ends placed in the side of the fixed plate and second ends placed in the side of the pivotal plates, the first or second ends being fixed to allow relative rotational movement between the fixed and pivotal plates; braking members provided around the rotation shafts for applying braking force; and braking housings provided around the braking members and with first fixed ends opposite to the fixed ends of the rotation shaft for applying braking force to faces contacting with the braking members.

The hinge structure for a flat visual display device of the invention as set forth above allows frictional force generated from around the rotation shaft to support the weight of the flat visual display device as well as the frictional force applied in the time of manufacturing the hinge structure to be continuously applied to the rotation shaft without change in use of the hinge structure thereby further elevating the reliability of thereof.

BEST MODE FOR CARRYING OUT THE INVENTION

The following detailed description will present a preferred embodiment of the invention in reference to the accompanying drawings by way of examples.

Figure 1:
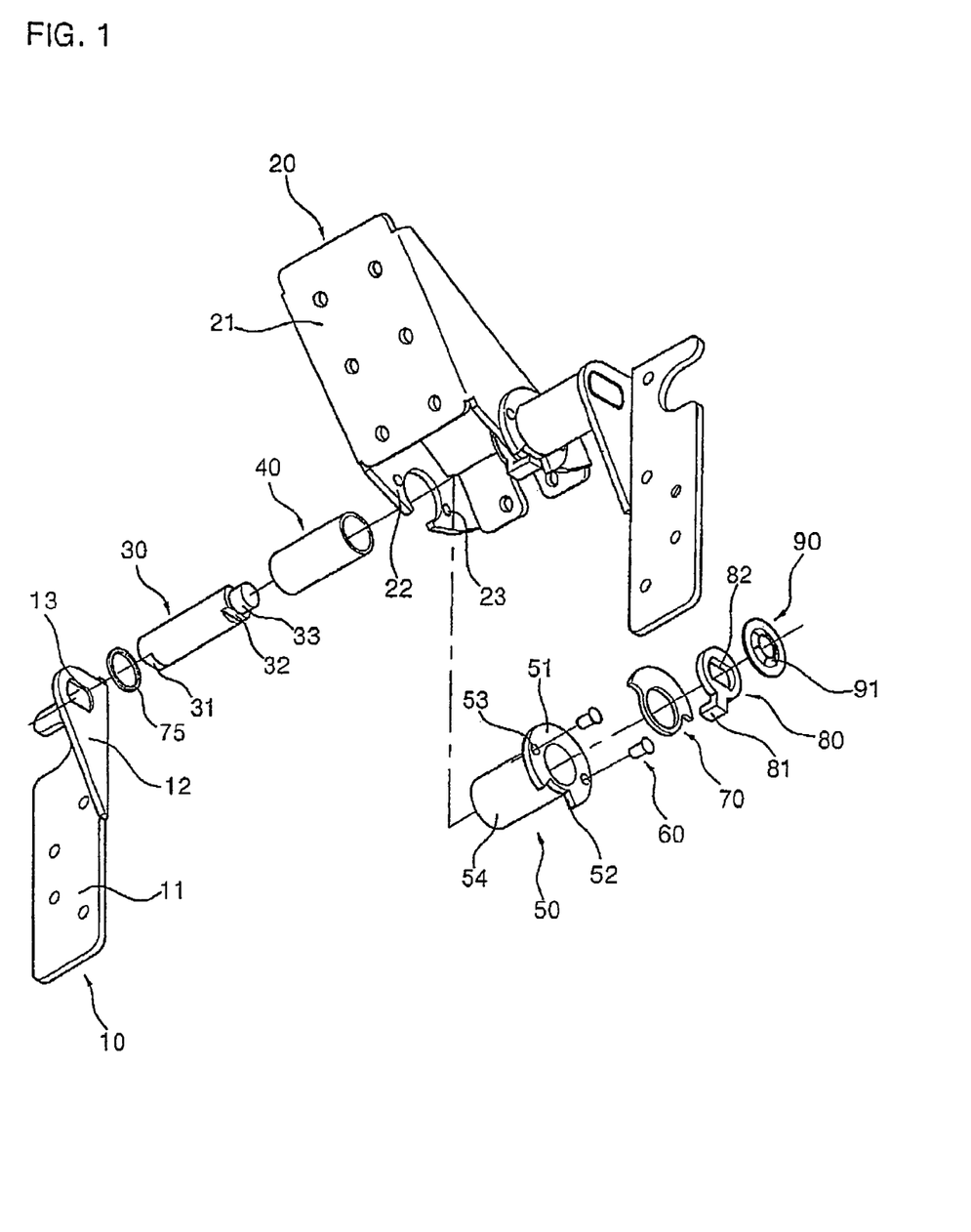
FIG. 1 is an exploded perspective view of a hinge structure for a flat visual display device of the invention.

FIG. 1 is an exploded perspective view of a hinge structure for a flat visual display device of the invention.

Briefly describing the configuration of the invention in reference to FIG. 1, the hinge structure comprises pivotal plates 10 for allowing vertical pivoting to pivotal members of a flat visual display device and so on which are attached thereto, a fixed plate 20 attached to a fixed member and functioning as a supporting section for supporting the weight of the pivoting members, rotation shafts 30 inserted into vertical planes of the fixed plate 20 and the pivotal plates 10 for allowing hinge movement thereto, braking members 40 provided around the rotation shafts 30 for functioning as braking planes and braking housings 50 provided around the braking members 40 and relatively fixed in respect to rotation of the rotation shafts 30 for generating frictional force functioning as braking force between the braking members 40 and the rotation shafts 30.

In particular, the pivotal plates 10, the rotation shafts 30, the braking members 40 and the braking housings 50 are provided in pairs in both sides of the fixed plate 20. Although description will be made in reference to only those components in one side considering the identical components are provided in pairs in the both sides, it will be identically applied to all components in the both sides.

The above-mentioned components will be specifically described according to their portions.

The pivotal plate 10 has a pivotal horizontal plane 11 with a number of fastening holes and a fixed vertical plane 12 with a shaft-supporting portion 13 for insertionally receiving the rotation shaft 30 to identically carry out rotational movement between the rotation shaft 30 and the pivotal plate 10.

The fixed plate 20 has a fixed horizontal plane 21 with a number of fastening holes and fixed vertical planes 22 each with an opening for insertionally receiving the rotation shaft 30 and the second housing-fixing holes 23 for fixing the braking housing 50.

The rotation shaft 30 is inserted by its both ends into the pivotal plate 10 and the fixed plate 20, and has a fixing portion 31 in the pivotal side and a fixing portion 32 and a fixing end 33 in the fixing side. The fixing portion 31 is so configured with its axially opposed section similar to an oval that the one end facing the pivotal plate 10 is inserted into the shaft-supporting portion 13 to impart the identical rotation to the rotation shaft 30 and the pivotal plate 10. The fixing portion 32 and the fixing end 33 cause the other end facing the fixed plate 20 to be fixedly inserted into the fixed plate 20.

The braking member 40 is interference-fit around the rotation shaft 30 to generate frictional force functioning as source of braking force, the braking housing 50 is fixed together with the fixed plate 20 around the braking member 40 unlike to the rotation shaft 30.

Describing the configuration of the braking housing 50 in detail, the braking housing 50 has a braking portion 54 provided around the braking member 40 for generating direct frictional force, a stopper guide 51 provided in one side of the braking portion 54 and placed in the inner face of the fixed vertical plane 22, a projection-receiving groove 52 provided in the outer circumference of the stopper guide 51 by cutting a portion thereof and the first housing-fixing holes 53 provided at least in a pair in certain portions of the stopper guide 51 for allowing the braking housing 50 to fixedly face-contact with the fixed vertical plane 22.

The first housing-fixing holes 53 and the second housing-fixing holes 23 are aligned so that housing-fastening members 60 are inserted through the holes 53 and 23 to fix the braking housing 50 to the fixed plate 20. The housing-fastening members 60 preferably adopt rivets.

In the meantime, the fixing portion 32 in the fixing side of the entire length of the rotation shaft 30 is longer than and extended beyond the braking housing 50. The fixing portion 32 has the same configuration as the fixing portion 31 in the pivotal side, and a stopper 80 is fitted around the fixing portion 32. The stopper 80 has the second shaft-supporting portion 82 for insertionally receiving the fixing portion 32 in the fixing side to allow rotation identical with the rotation shaft 30 and a stopper projection 81 adapted for settling in the projection-receiving groove 52 to restrict the pivoting angle of the pivotal plate 10. The first washer 70 is provided with a certain configuration in the contact face between the stopper 80 and the braking housing 50 to restrict any noise or abrasion between both of the stopper 80 and the braking housing 50.

Further, an anti-release member 90 is fit around the circular fixing end 33 further extended beyond the fixing portion 32. The anti-release member 90 is provided with a number of folded faces 91 in portions contacting with the fixing end 32. The folded faces 91 prevent release of the fit anti-release member 90 so that the stopper 80 inserted inside the anti-release member 90 and the first washer 70 may not be released from the rotation shaft 30.

The operation of the hinge structure according to the inventive configuration will be discussed as follows in reference to the above description.

In the rotation shaft 30, the fixing portion 31 in the pivotal side is non-circularly configured, and inserted into the first shaft-supporting portion 13 of the pivotal plate 10. The fixing portion 31 in the pivotal side and the first shaft-supporting portion 13 are non-circularly configured allowing the rotation shaft 30 and the pivotal plate 10 to rotate with the same rotation angle. That is to say, the rotation shaft 30 is securely fixed to the pivotal plate 10 to prevent any relative movement each other.

The fixing portion 32 in the fixing side of the rotation shaft 30 inserted into fixed plate 20 is non-circularly configured as the fixing portion 31 in the pivotal side, and inserted into the second shaft-supporting portion 82 in the stopper 80 to securely fix the stopper 80 preventing any rotation thereof.

The stopper projection 81 in the outer circumference of the stopper 80 is placed in the projection-receiving groove 52 of the braking housing 50 to adjust the pivoting range of the pivotal plate 20 in respect to the fixed braking housing 50 and fixed plate 20. In other words, the fixed plate 20 and the braking housing 50 are integrally fixed and rotated together. On the other hand, the pivotal plate 10 integrally rotates together with the rotation shaft 30 and the stopper 80. Therefore, the braking member 40 provided between the braking housing 50 and the rotation shaft 30 generates frictional force between the braking housing 50 and the rotation shaft 30 so that the pivotal plate 10 can be braked.

Figure 2:
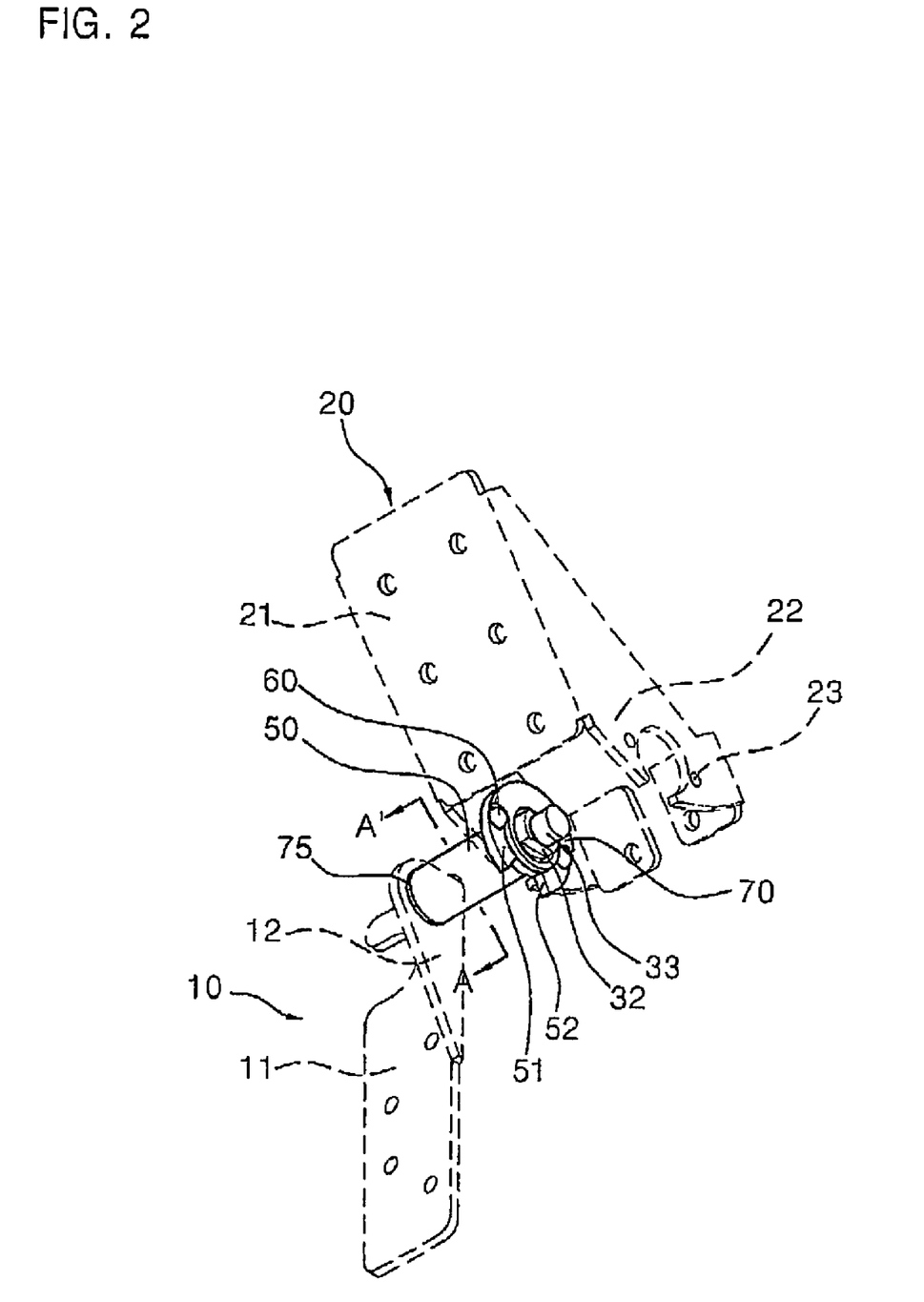
FIG. 2 is a perspective view of a braking section in a hinge structure of the invention.

FIG. 2 is a perspective view of a braking section in the hinge structure of the invention.

Referring to FIG. 2, the braking section includes the rotation shaft 30, the pivotal plate 10, the fixed plate 20, the braking member (refer to the reference numeral 40 in FIG. 1) around the rotation shaft 30 and the braking housing 50 around the braking member 40. The braking housing 50 is fastened with the fixed plate 20 by piercingly inserting the housing-fastening members 60 through the housing 50 and the fixed plate 20 from one side and riveting the same at the other side.

Describing the operation in reference to the above configuration, the stopper guide 51 is outwardly extended from one end of the braking housing 50 in the side of the fixed plate 20, and strongly fixed to the fixed vertical plane 22 via the housing-fastening members 60 so that the braking housing 50 identically moves with or is fixed to the fixed housing 20.

Further, the braking member 40 is inserted in the circular contact face between the outer circumference of the rotation shaft 30 and the inner circumference of the braking housing 50, and generates the frictional force owing to the relative rotational movement between the rotation shaft 30 and the braking housing 50 thereby to produce the braking force to the hinge structure.

In the meantime, the hinge structure has braking ability adjustable according to the length of the braking member 40, that is the area of a portion for producing friction in the braking member 40 or the degree of interference fit of the braking member 40.

Figure 5:
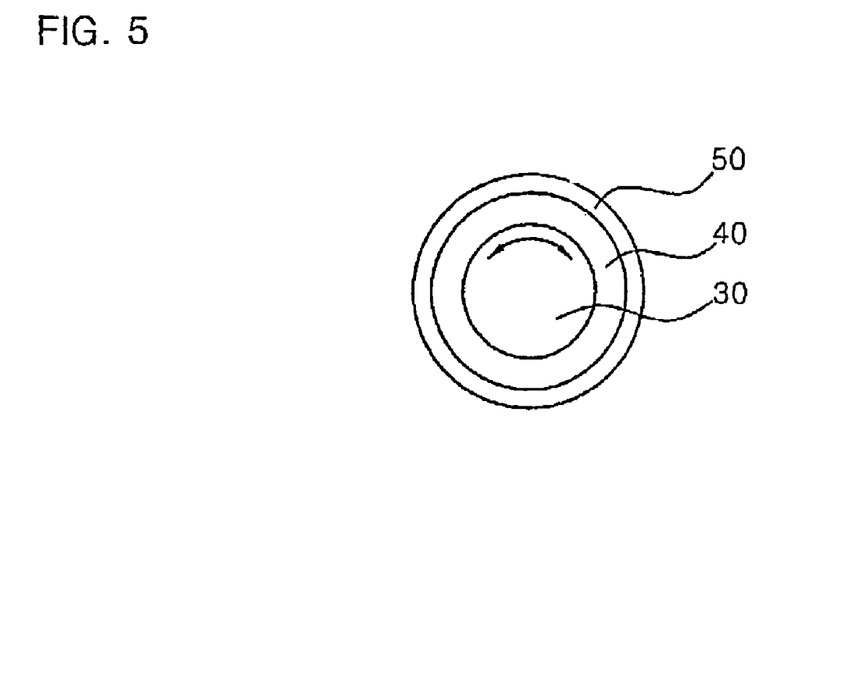
FIG. 5 is a perspective view illustrating the braking section in the hinge structure of the invention, which further includes an anti-release member.

FIG. 5 is a sectional view taken along a line A—A m FIG. 2 for illustrating the operation of the braking member in the hinge structure of the invention.

Referring to FIG. 5, the hinge structure of the invention exerts the braking ability in cooperation of the rotation shaft 30 fixed identical with the pivotal plate (refer to the reference numeral 10 in FIG. 1), the braking housing 50 executing the same operation and rotation as the fixed plate (refer to the reference numeral 20 in FIG. 1) and the braking member 40 interference-fit in the contact face between the rotation shaft 30 and the braking housing 50. Where the rotation shaft 30 is rotated owing to rotation of the pivotal plate 10 while the braking housing 50 is fixed by the fixed plate 20, the rotation shaft 30 inevitably slides in the contact face in respect to the braking housing 50 resultantly generating the frictional force to the contact face.

With regard to the above basic operation, a certain amount of frictional force is generated to the braking member 40 in the contact face that is between the rotation shaft 30 and the braking housing 50, and operates as the basic power for restricting the rotation and related operations of the pivotal plate 10.

As indicated with an arrow, the rotation shaft 30 rotates while the braking housing 50 is stopped, the frictional force takes place inside or outside the braking member 40. Although the braking member 40 may rotate together with the rotation shaft 30 or the braking member 40 may rotate together with the braking housing 50 so as to generate the frictional force inside or outside the braking member 40, the braking force identically takes place owing to the frictional force.

Further, the braking member 40 is inserted with a different magnitude of force or contacts to the rotation shaft 30 and the braking housing 50 with a different area for the purpose of adjusting the weight of the flat visual display device and the force applied when a user tries to move the flat visual display device vertically or laterally. In this regard, the hinge structure of the invention can be slightly varied in size and configuration.

Preferably, the braking member 40 is preferably made of plastic, and more preferably made of engineering plastic.

Figure 3:
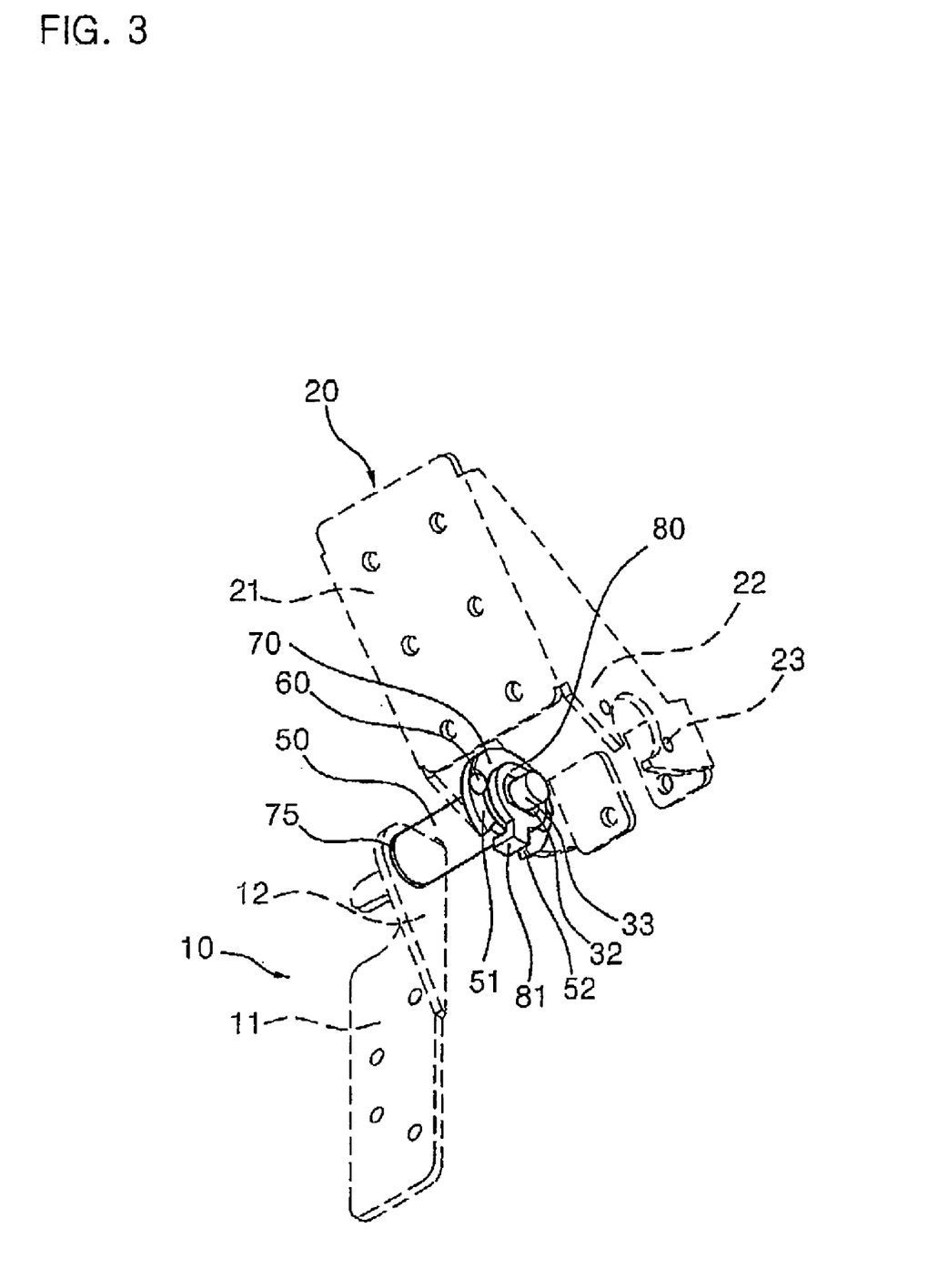
FIG. 3 is a sectional view taken along a line A—A in FIG. 2 for illustrating the operation of the braking member in the hinge structure of the invention.

FIG. 3 is a perspective view illustrating the braking section in the hinge structure of the invention, in which the braking section further includes a stopper.

Referring to FIG. 3, the braking section further includes the stopper 80, which is inserted into a supporting portion 32 in the fixing side so as to move or be fixed identical with a pivotal plate 10.

Further, a stopper projection 81 is placed in a projection-receiving groove 52 of a braking housing 50 so that the stopper 80 can be placed within the range of the projection-receiving groove 52 thereby restricting the relative rotation range of the pivotal plate 10 and the fixed plate 20.

More specifically, when the pivotal plate 10 is pivoted owing to vertical displacement of the flat visual display device, the stopper 80 and the stopper projection 81 are also pivoted identically. However, a stopper guide 51 constituting one end of the braking housing 50 is fixed together with the braking housing 50. As a result, the stopper projection 81 is pivoted within the range restricted by the projection-receiving groove 52 cut in a portion of the outer circumference of the stopper guide 51. Such a configuration can restrict the pivoting angle of the pivotal plate 10.

Figure 4:
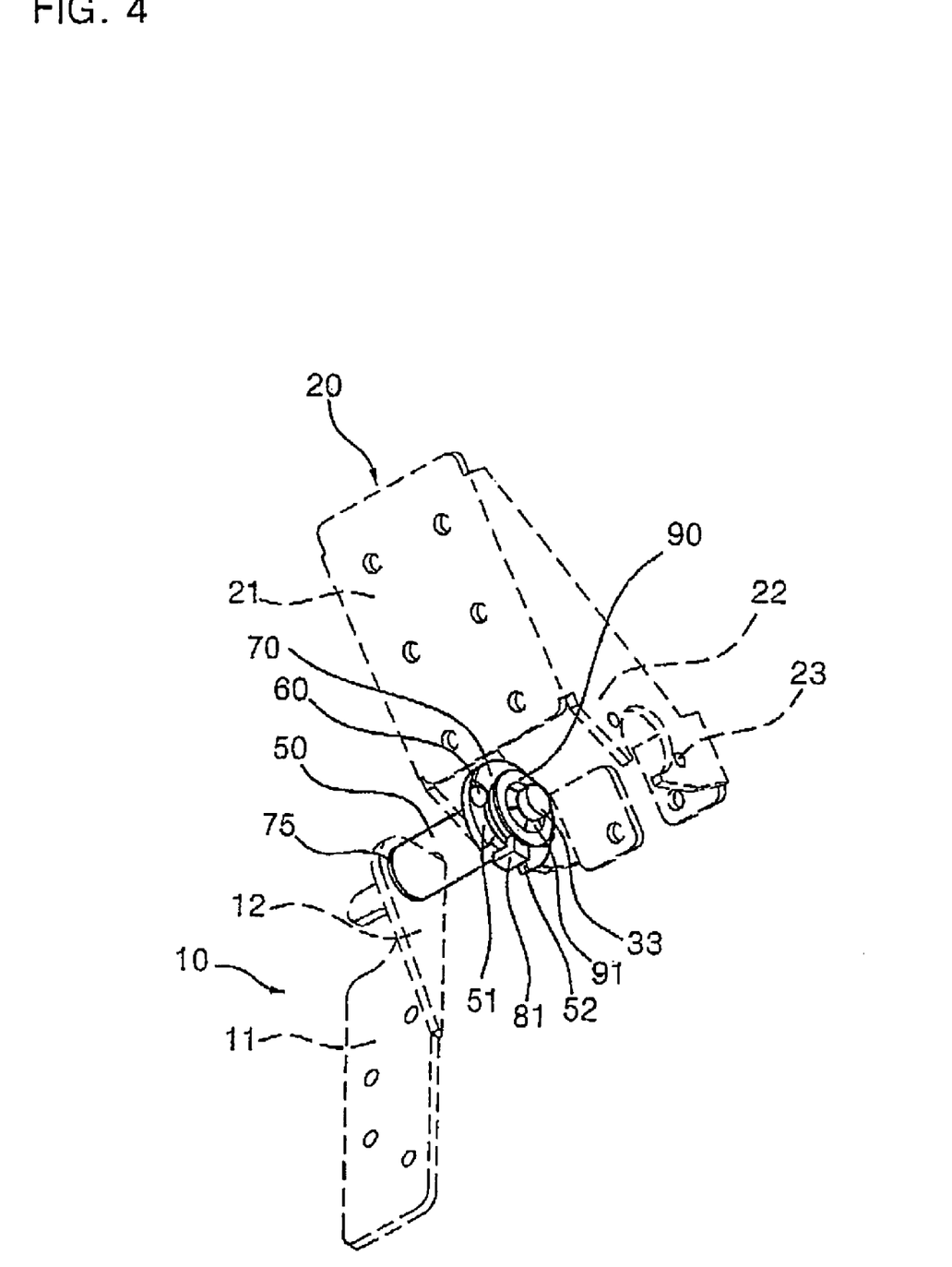
FIG. 4 is a perspective view illustrating the braking section in the hinge structure of the invention, which further includes a stopper.

FIG. 4 is a perspective view illustrating the braking section in the hinge structure of the invention, which further includes an anti-release member.

Referring to FIG. 4, a braking housing 50 is fixedly provided in a fixed vertical plane 22 of the fixed plate without release or slip. However, this has a problem that the first washer 70 and the stopper 80 provided outer from the stopper guide 51 may be released away from the rotation shaft 30 without a certain support structure. The hinge structure further has an anti-release member 90 in order to prevent such a problem.

The anti-release member 90 is provided in a central hole with a number of folded faces 91 so that the anti-release member 90 is not released from the rotation shaft 30 once fit around the rotation shaft 30. The folded faces 91 are inclined at a certain angle to generate a bearing force so that the anti-release member 90 may not released outward once fit around the rotation shaft 30.

The anti-release member 90 will not be restricted to the specific configuration as disclosed above, and may be proposed into any configuration so long as it can exert a certain degree of bearing operation such as a nut.

Figure 6:
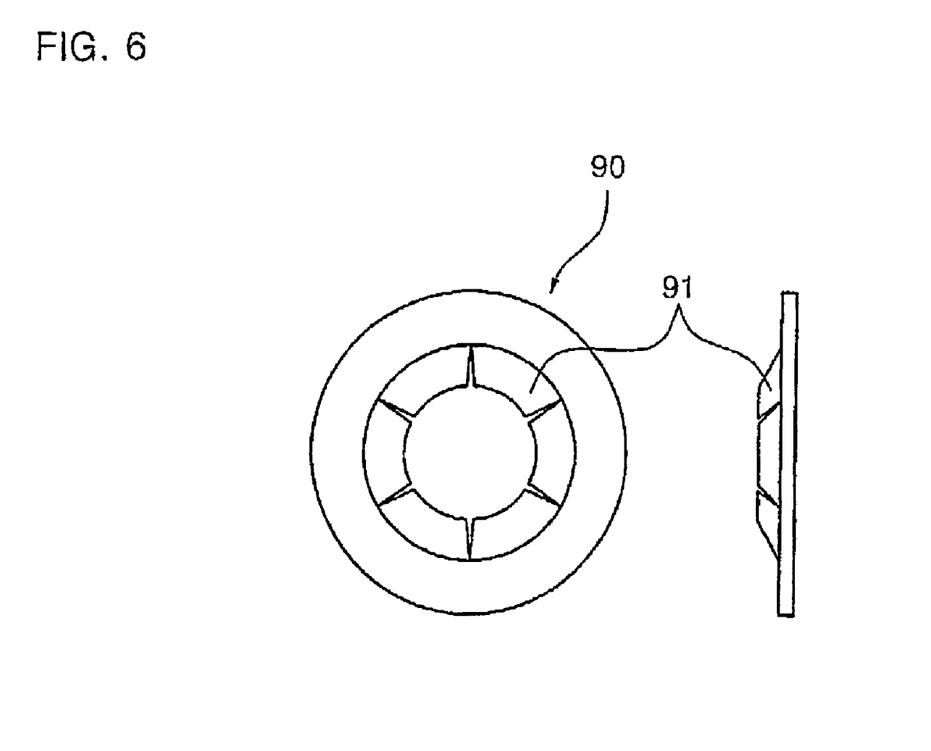
FIG. 6 is rear and side elevation views of the anti-release member of the invention.

FIG. 6 is rear and side elevation views of the anti-release member of the invention.

Referring to FIG. 6, the anti-release member is provided with an opening in a central portion of a circular metal sheet for fitting around the fixing end 33. The anti-release member has a number of folded faces 91 around the opening for contacting with the rotation shaft 30 to prevent the inserted rotation shaft 30 from be released.

In the meantime, the folded faces 91 are folded in an orientation for preventing release of the rotation shaft 30, in particular, in the same direction of inserting the rotation shaft 30. This configuration allows the rotation shaft 30 to be inserted without interference of the anti-release member 90 while the interference of folded faces 91 prevents the rotation shaft 30 from be released.

Figure 7:
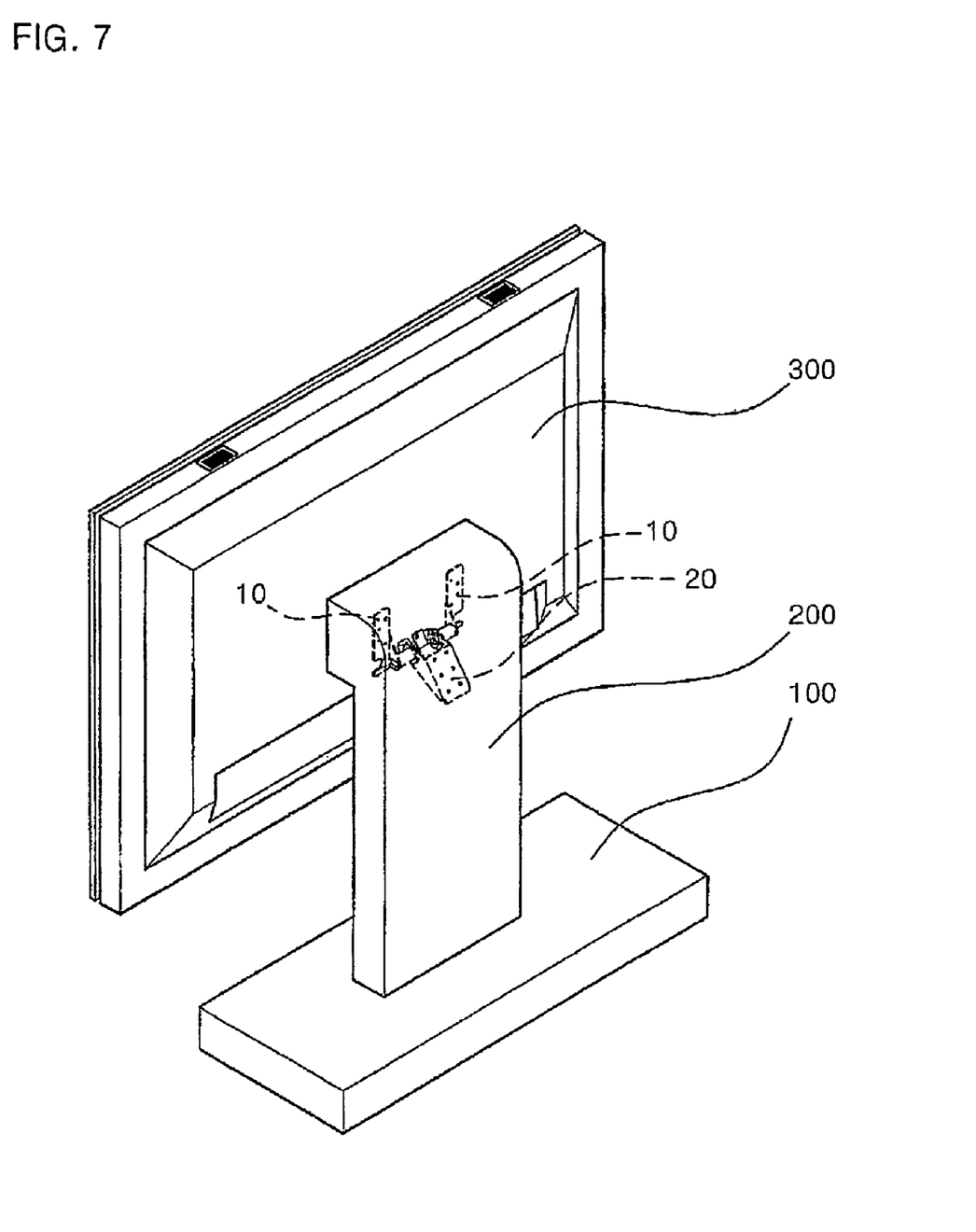
FIG. 7 illustrates the hinge structure of the invention in use.

FIG. 7 illustrates the hinge structure of the invention used in a flat visual display device.

Referring to FIG. 7, the hinge structure of the invention comprises pivotal plates 10 fastened with the flat visual display device 300 and a fixing plate 20 fastened to a supporting section 200 for supporting the flat visual display device 300. Further, a base 100 is provided under the supporting section 200 allowing the flat visual display device to stand right.

When the flat visual display device 300 is vertically pivoted, the pivotal plates 10 are also vertically pivoted. This generates a certain amount of braking force to the rotation shafts (refer to the reference numeral 30 in FIG. 1) in both sides resultantly producing braking force to stop the rotation shafts 30.

As set forth above, the hinge structure for the flat visual display device of the invention will not be restricted in its application to the flat visual display device only, but can be conveniently adopted to a number of applications in which a certain amount of weight is supported and a certain amount of braking force is applied as well.

The spirit of the invention may not be restricted to the above-mentioned embodiments but it will be easy for those skilled in the art to devise other inventions through additions, modifications and omission of the components.

INDUSTRIAL APPLICABILITY

As an effect, the hinge structure for the flat visual display device of the invention can reduce the number of the washers provided in the contact face between the fixed member and the rotation member to overcome the difficulty in a manufacturing process.

Further, the invention makes the frictional force functioning as the braking force to generate in the outer circumference of the rotation shaft so that the braking ability set according to the weight of the flat visual display device may not be changed even though an article is used thereby allowing the article to be used almost permanently.

Moreover, in the hinge structure of the invention, once the frictional faces are formed by the braking members, the originally intended braking ability can be provided without any change for a certain time period even though a fastening device such as bolts or transformable spring mechanism is not applied.

The invention claimed is:

1. A hinge structure for a display device, comprising:
   a fixed plate configured to be attached to a support structure for the display device, wherein the fixed plate includes at least two housing fixing holes;
   a pivotal plate configured to be attached to a display device;
   a rotation shaft, wherein a first end of the rotation shaft is coupled to the fixed plate and a second end of the rotation shaft is coupled to the pivotal plate, and wherein the rotation shaft allows relative rotational movement between the fixed plate and the pivotal plate;
   a braking housing having a stopper guide, wherein at least two housing fixing holes are formed in braking housing such that they are aligned with the housing fixing holes in the fixed plate;
   a stopper mounted on the first end of the rotation shaft, wherein the stopper comprises a stopper projection that interacts with the stopper guide to limit rotation of the pivotal plate relative to the fixed plate;
   a plurality of housing fasteners, wherein the plurality of housing fasteners are inserted into the housing fixing holes on the fixed plate and the braking housing to attach the braking housing to the fixed plate; and
   a cylindrical braking member mounted between an exterior surface of the rotation shaft and an interior surface of the braking housing and that is configured to provide a frictional force that tends to prevent the pivotal plate from rotating with respect to the fixed plate.

2. The hinge structure of claim 1, wherein the housing fixing holes, formed in the braking housing are formed in the stopper guide of the braking housing.

3. A hinge structure for a display device, comprising:
   a fixed plate configured to be attached to a supporting structure for the display device, wherein the fixed plate includes a plurality of housing fixing holes;
   first and second pivotal plates configured to be attached to a display device;
   first and second rotation shafts, wherein a first end of each rotation shaft is coupled to the fixed plate and wherein a second end of each rotation shaft is coupled to one of the pivotal plates, and wherein the rotation shafts allow relative rotational movement between the fixed plate and the pivotal plates;
   first and second braking housings, wherein each braking housing has a stopper guide with a projection receiving groove, and wherein at least two housing fixing holes are formed in the first and second braking housings such that they are aligned with the housing fixing holes in the fixed plate;
   a plurality of housing fasteners, wherein the plurality of housing fasteners are inserted into the housing fixing holes on the fixed plate and the first and second braking housings to attach the first and second braking housings to the fixed plate;
   first and second stoppers, that are coupled, respectively, to a first end of the first and second rotation shafts, and wherein each stopper has a projection that is received in the projection receiving groove of one of the braking housings to limit rotation of the pivotal plates relative to the fixed plate; and
   first and second cylindrical braking members, mounted between exterior surfaces of the first and second rotation shafts and interior surfaces of the first and second braking housings, respectively, and wherein each braking member is configured to provide a frictional force that tends to prevent a pivotal plate from rotating with respect to the fixed plate.

4. The hinge structure of claim 3, wherein the housing fixing holes formed in the first and second braking housings are formed in the stopper guides of the first and second braking housings.

* * * * *